United States Patent Office 3,307,473
Patented Mar. 7, 1967

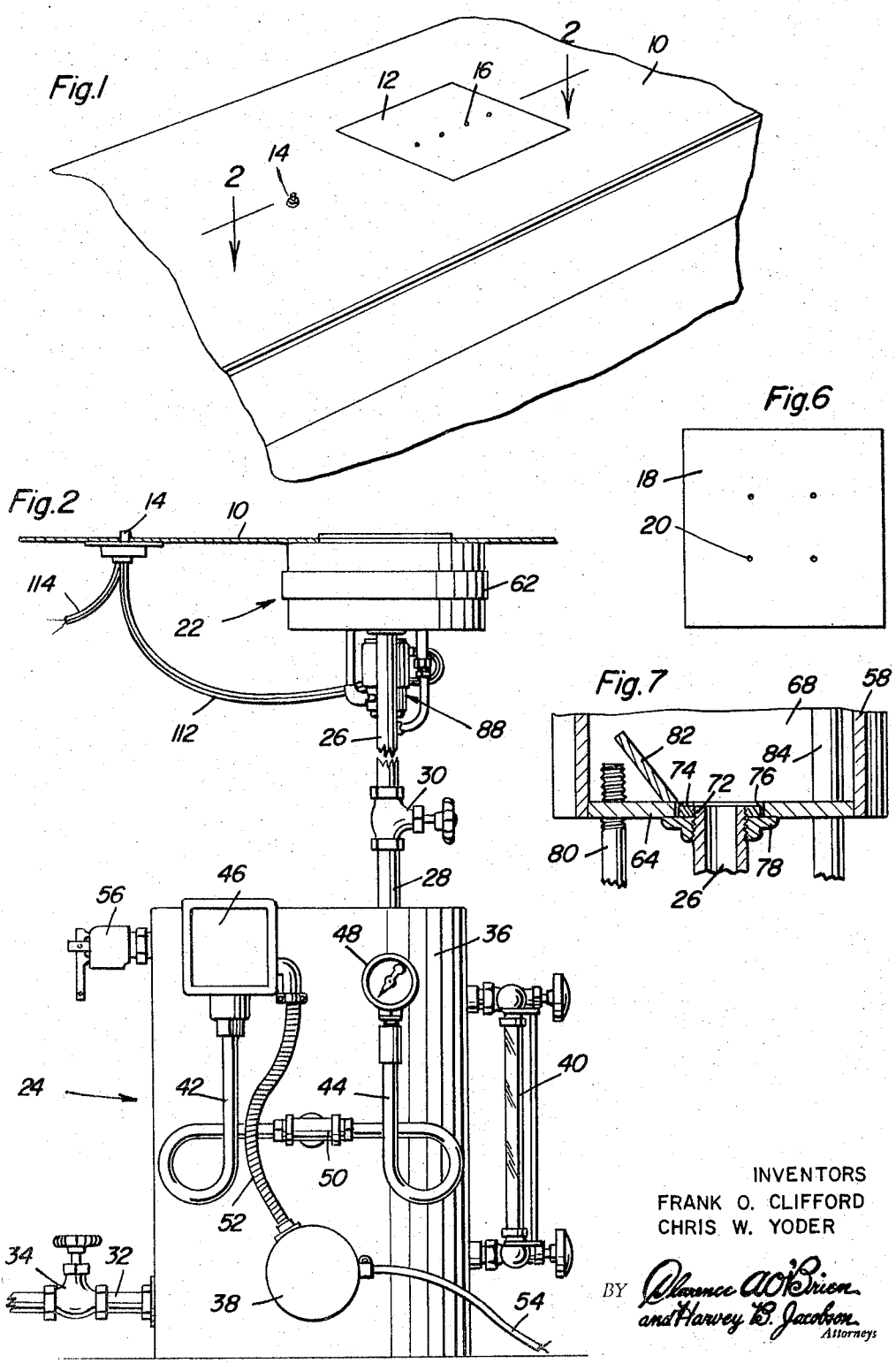

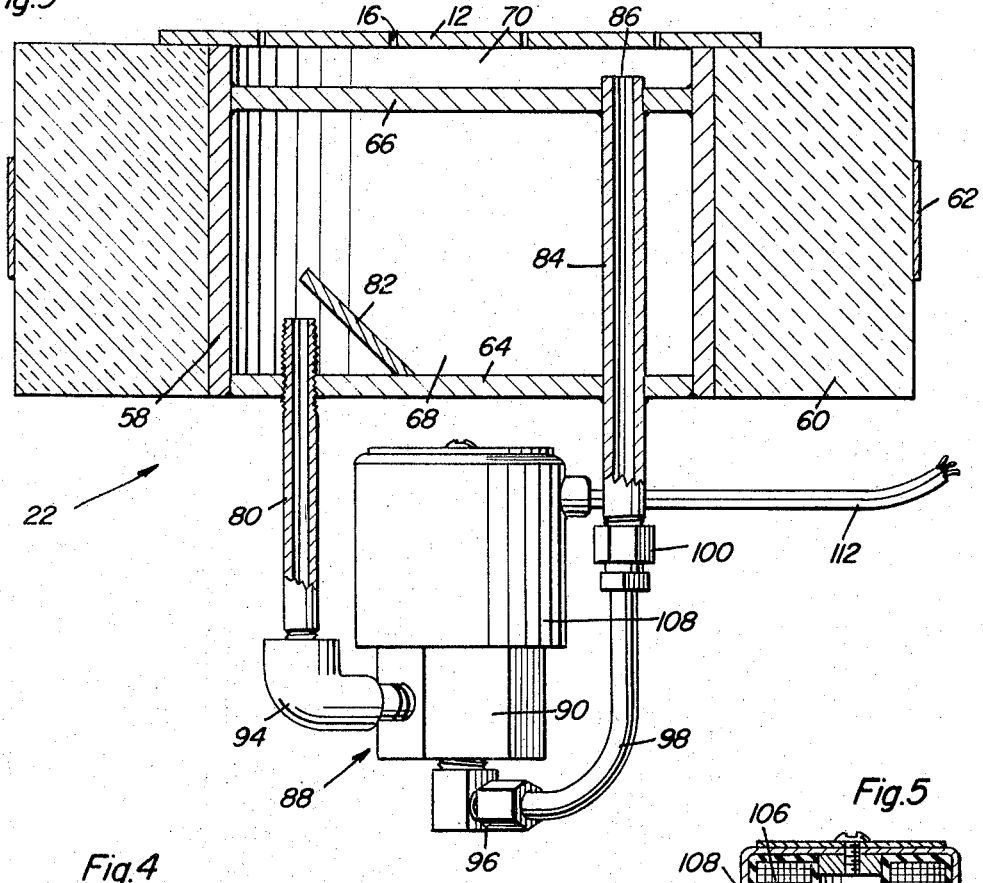
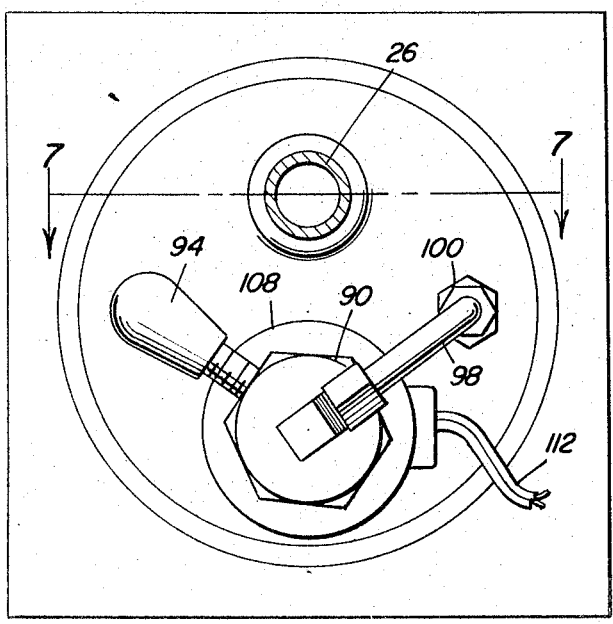
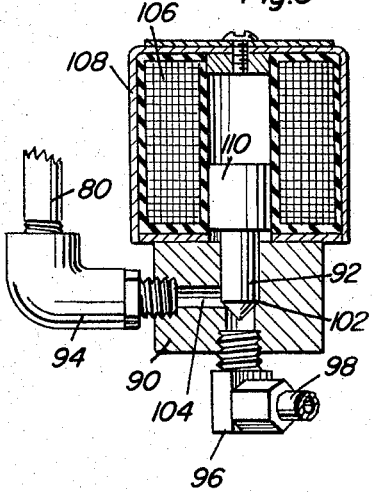

3,307,473
HEATER FOR FOOD PRODUCTS
Frank O. Clifford, Kokomo, and Chris W. Yoder, Goshen, Ind., assignors to Komo Corporation, Kokomo, Ind., a corporation of Indiana
Filed Oct. 10, 1960, Ser. No. 61,461
12 Claims. (Cl. 99—234)

This invention relates to apparatus for heating and maintaining food products such as buns for hamburgers, rolls for hotdogs, and the like in a warm fresh-like condition.

In commercial establishments which both prepare and dispense large volumes of food products for consumption on the premises or for take-out orders, a serious problem arises in connection with having a large supply of food products available which must be dispensed in a warm fresh-like condition at different times despite the fact that such food products loose their fresh quality within a short period of time. Such problems exist especially in connection with bread products including hamburger buns, hotdog rolls and the like. It is impracticable for an establishment dispensing large quantities of hamburgers and hotdogs for example to be steadily supplied with fresh bread products all day. Accordingly, these bread products are delivered in sufficient quantities and individually heated and maintained warm at the time it is being used to form a sandwich about some meat product. This invention therefore is primarily concerned with the apparatus for conditioning the bread products hereinabove referred to for immediate use as desired. It is therefore a primary object of this invention to provide food warming apparatus which will instantaneously heat the food products and then maintain it warm during preparation of the item being prepared.

Another object of this invention is to provide heating and warming apparatus for buns, rolls or the like which will not only heat and warm the product but will do so in a manner as to give it a fresh-like quality.

An additional object of this invention is to provide apparatus for instantaneously heating and maintaining warm buns, rolls or the like by application thereto of a dry steam and warming heat which avoids rendering the buns, rolls or the like soggy as has heretofore characterized previously used apparatus. Also, the buns, rolls or the like so conditioned are not rendered dry or brittle.

A still further object of this invention is to provide a heating head assembly mounted below a sandwich wrapping table, which table exposes a hot plate forming the top of the heating head assembly upon which the buns may be placed for heating and warming thereof pursuant to this invention.

A still further object of this invention is to provide a heating head assembly for heating and warming purposes in combination with a miniature boiler device all of which apparatus is mounted below a sandwich wrapping table and selectively operable to supply a charge of dry steam for heating a bun placed on the hot plate, which hot plate otherwise maintains the bun in a warm condition.

The apparatus of this invention therefore includes the combination of a miniature boiler device including an insulated tank into which inlet water may be admitted. An electrical heating unit converts the water into steam, which heating unit is controlled by a pressure responsive device so as to supply steam from the boiler device at a predetermined pressure. The heating head assembly is connected to the boiler device which heating head assembly is mounted below the sandwich wrapping table. The top of the heating head is in the form of a hot plate received within an opening within the table, which hot plate has a plurality of apertures therein through which dry steam is ejected for heating the bun or roll placed upon the hot plate. Also, the hot plate will be maintained in a heated condition by the heating head assembly so as to maintain the bun warm after initially being heated. The heating head assembly has defined therein a steam pressure chamber in heat exchanging relation to a dry steam chamber disposed thereabove and just below the hot plate. A solenoid actuated valve mechanism controls the admission of steam from the steam pressure chamber into the dry steam chamber in such a manner that only dry steam is admitted thereto avoiding the ejection of wet steam through the apertures in the hot plate to thereby prevent the bun or roll placed on the hot plate from becoming soggy. A momentary type switch device is therefore mounted adjacent the hot plate for momentarily energizing the solenoid to actuate the valve mechanism whereby a charge of dry steam may be ejected from the apertures in the hot plate to instantaneously heat the bun or roll placed upon the hot plate. The apertures on the hot plate are therefore so arranged geometrically relative to the bun or roll placed on the hot plate as to evenly distribute the heat or dry steam applied to the products. It will therefore be appreciated that the novel heating head assembly not only heats and warms the food product but also conditions it by reducing the moisture of the steam so that the bun or rolls will have a warm fresh-like quality. Also, the heat head assembly operates in a rapid manner commensurate with the requirements of a large volume enterprise. Furthermore, the heating head assembly may be manufactured economically and easily installed in any desired installation together with the miniature boiler device for supplying steam thereto.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a partial perspective view of a sandwich wrapping table illustrating the installation of the heating head assembly of this invention.

FIGURE 2 is a side elevational view taken substantially through a plane indicated by section line 2—2 in FIGURE 1 and illustrating the boiler device and heating head assembly combination of this invention.

FIGURE 3 is a side sectional view through the heating head assembly of this invention.

FIGURE 4 is a bottom view of the heating head assembly.

FIGURE 5 is a partial sectional view illustrating the solenoid actuated valve mechanism.

FIGURE 6 is a top plan view of a second form of hot plate that may be used in conjunction with the heating head assembly of this invention.

FIGURE 7 is a partial sectional view taken substantially through a plane indicated by section line 7—7 of FIGURE 4.

Referring now to the drawings in detail, FIGURE 1 illustrates one exemplary installation for the apparatus of this invention. It will therefore be observed that the sandwich wrapping table top generally indicated by reference numeral 10 has mounted therein and extending slightly thereabove, a hot plate generally indicated by reference numeral 12. Also, a momentary type switch device 14 is mounted projecting above the table top 10 adjacent to the pot plate 12 so that upon actuation of the switch 14 and release thereof, dry heating steam will be ejected through the apertures 16 in the hot plate 12 in order to instantaneously heat a hotdog roll for example which is placed above the apertures 16 on the hot plate 12. It will be observed in FIGURE 1 that the apertures 16 are arranged in a line so as to evenly distribute the dry steam onto an elongated hotdog roll placed over the apertures. It will therefore be apparent that one need only place the hotdog roll above the apertures 16 on the hot plate 12 and depress the switch button 14 whereupon the steam will heat the roll to the required temperature and the plate 12 will retain the roll warm until the hotdog is prepared. In FIGURE 6, a similar hot plate 18 is illustrated which hot plate differs from hot plate 12 only in that the apertures 20 thereof are arranged differently so as to evenly distribute the dry steam ejected therefrom onto a round-like hamburger bun. In both cases, the hot plate 12 or 18 forms the top of a heating head assembly generally indicated by a reference numeral 22.

Referring now to FIGURE 2 in particular, it will be be observed that the heating assembly generally indicated by reference numeral 22 and the boiler device generally indicated by reference numeral 24 are mounted below the sandwich wrapping table top 10. The boiler device 24 is of a miniature design adapted to be installed beneath the table 10 and connected by a conduit 26 to the heating head assembly 22. It will therefore be observed that the boiler device 24 has a steam outlet conduit 28 which is connected to the steam inlet conduit 26 for the head assembly 22 by means of a steam stop valve 30. The heating head assembly may thereby be shut down when not in use. The boiler device 24 on the other hand is supplied with tap water by a conduit 32 and includes a cold water inlet valve 34 by means of which the boiler device may be shut down. The boiler device includes an insulated tank concentrically disposed within a tank shell member 36 enclosing therewithin all attachments to the boiler tank. Water entering the boiler device through conduit 32 may therefore be heated into steam by the heating unit 38 in a manner well known to those skilled in the art, the boiler device also being provided internally with the proper baffling in protective relation between the incoming water and the heating unit 38. A boiler level sight device 40 is therefore also provided and the boiler device also has mounted thereon a pair of steam pressure lines 42 and 44 connected respectively to a control box 46 and pressure gauge 48. The pressure lines are connected by means of a T-connector 50 to the side of the boiler tank 36. Accordingly, the pressure gauge 48 will indicate the pressure of the steam generated by the boiler while the control box 46 may respond to the pressure and perhaps to a temperature responsive element within the tank 36 to thereby control the heating element unit 38 in a manner well known to those skilled in the art. Electrical conduit 52 therefore interconnects the heating unit 38 to the control box 46 while a power inlet line 54 is also operatively connected to the heating unit 38. It will also be observed from FIGURE 2 that a safety pop-off valve unit 56 is provided in order to limit the maximum pressure of the steam generated within the tank 36 of the boiler device. It will therefore be apparent that the boiler device 24 will continuously supply steam under pressure to the heating head assembly 22 for accomplishing the objectives of this invention.

Referring now to FIGURES 3, 4, 5 and 7, it will be observed that the heating head assembly 22 comprises a cylindrical member 58 about which a sheet of insulation 60 is disposed. A strap member 62 holds the insulation 60 assembled on the member 58 and may also provide the means for anchoring or mounting the head assembly 22 below the table 10. The hot plate 12 is therefore welded to the top end of the cylindrical member 58 and the thickness of the hot plate 12 projects above the top surface of the table 10. With the cylindrical member 58 being closed at the top end by the hot plate 12, the bottom end of the member 58 is closed by means of a bottom plate 64 which is welded thereto with the bottom surface of the bottom plate 64 being flush with the bottom end of the member 58. Also, as more clearly seen in FIGURE 3, a partition plate 66 is connected internally to the inner walls of the member 58 intermediate the top and bottom ends thereof but closer to the top end. The partition plate 66 also may be welded in position as illustrated. Accordingly, the partition plate 66 defines therebelow a steam pressure storage chamber 68 while thereabove the partition plate 66 defines a dry steam chamber 70. It will therefore be apparent that the steam pressure storage chamber 68 which is connected to the steam inlet 26 will be in heat transfer relationship to the dry steam chamber 70 through the partition plate 66 so as to maintain the chamber 70 heated at all times. On the other hand, the dry steam chamber is in communication with the apertures 16 so as to supply therethrough or eject therethrough the dry steam with which the chamber 70 becomes charged in order to provide for the instantaneous heating hereinbefore indicated. It will therefore be appreciated that the disposition of the dry steam chamber 70 above the pressure chamber 68 is significant inasmuch as the heated steam within the chamber 68 rises to the top thereof for maintaining the maximum temperature of the chamber 68 at the bottom surface of the partition plate 66 in order to continuously heat the chamber 70. The chamber 70 being disposed above the pressure chamber 68 and only selectively and momentarily charged with steam will therefore always avoid accumulation of condensation therein and thereby avoid rendering the buns or rolls soggy because of moisture carried with the steam through the apertures 16. The subsequently condensed moisture of the dry steam ejected through the apertures 16 will therefore provide the requisite and minimum moisture for conditioning the buns or rolls as desired. It will therefore be appreciated that it is essential that the steam delivered to the chamber 70 be devoid of any condensation that may be carried with the steam as it enters chamber 68 or as is condensed within the chamber 68.

It will therefore be observed from FIGURES 3, 4 and 7 that the steam inlet conduit 26 is connected to the bottom plate 64 by being threaded at an upper portion 72 thereof which is threadedly received within a fitting member 74 welded within an opening 76 within the bottom plate 64. An outer fitting member 78 also threadedly receives the upper portion 72 of the conduit 26 and is also welded to the bottom plate 64, as more clearly seen in FIGURE 7. On the other hand, a steam outlet conduit 80 as more clearly seen in FIGURE 3 is threadedly received within the bottom plate 64 and has an upper end thereof projecting above the bottom plate. It will therefore be apparent that condensation forming on the floor of the chamber 68 will not enter the steam outlet conduit 80 inasmuch as its upper end is disposed thereabove. Also, a baffle member 82 is connected to the bottom plate 64 within the chamber 68 and disposed in protective deflecting relation to the upper end of the steam outlet conduit 80 so as to avoid condensation forming within the chamber 68 from entering the outlet conduit 80. The bottom plate 64 also has connected thereto as by welding a dry steam delivery conduit 84. The upper end of the delivery conduit 84 to connected to and extends through the partition plate 66 with the open upper end 86 in communication with the dry steam chamber 70. It will be observed therefore, that the steam passing through the conduit 84 will be in heat transfer relationship to the steam within the chamber 68 so as to further heat the passing steam and avoid any condensation moisture from being admitted to the chamber 70.

It will therefore be apparent that a selectively operable means must be provided in order to connect the steam outlet conduit 80 to the steam delivery conduit 84 as described hereinbefore. Accordingly, a solenoid operated valve mechanism generally indicated by reference numeral 88 is provided for such purpose. Referring therefore to FIGURES 3, 4 and 5 it will be observed that the valve mechanism 88 includes a valve body portion 90 within which a valve plunger element 92 is disposed. The steam outlet conduit 80 is therefore connected to the valve body 90 by means of an elbow fitting 94 while the dry steam delivery conduit is connected to the valve body 90 by means of fitting 96, conduit 98 and fitting 100. The valve element 92 is therefore slidable within a stepped valve bore 102 to which the fitting 96 is connected for communication of the delivery conduit 84 with the valve bore 102 as seen in FIGURE 5. The conduit 80 on the other hand is connected by the fitting 94 to a transverse inlet bore 104 which is connected to the valve bore 102. The valve element 92 in the position illustrated in FIGURE 5 will therefore block communication between the conduits 80 and 84. In order to actuate the valve element 92, solenoid winding 106 is disposed within the solenoid casing 108 mounted above the valve body 90. The solenoid armature member 110 is connected to the valve element 92 for actuation thereof in an upward direction as viewed in FIGURE 5 in order to open the valve so as to admit steam from conduit 80 into conduits 98 and 84. The solenoid winding 106 is therefore momentarily energized for such purpose upon actuation and release of the switch 14. Electrical wiring conductors 112 are therefore connected to the winding 106 and extend laterally from one side of the solenoid casing 108 to the switch device 14 as seen in FIGURE 2. The electrical power may therefore be connected through the switch device 14 by means of conductors 114.

From the foregoing description, operation and utility of the apparatus of this invention will be apparent. It will therefore be appreciated that the heating head assembly 22 incorporates a pressure storage chamber providing a ready supply of steam for both heating the dry steam chamber 70 and supplying it with a charge of dry steam for instantaneous heating purposes. Accordingly, the pressure chamber includes structure such as the baffle member 82 and the extension of the outlet conduit above the bottom of the chamber as well as the passage of the delivery conduit 84 through the chamber to avoid carrying of condensed moisture with the steam supplied to the chamber 70. As a result thereof, no moisture will accumulate within the chamber 70 so that the steam ejected through the apertures 16 will never soak the buns or rolls even after prolonged and continuous use of the apparatus. It will also be appreciated that rapid heating may be effected by depression of the switch device 14 whereby energization of the solenoid winding 106 will open the valve mechanism 88 to supply a charge of steam to the chamber 70 for ejection through the apertures 16. Rapid, continuous, reliable and effective heating and warming of food products may therefore be accomplished by the use of the apparatus of this invention to a degree not heretofore possible.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus for warming buns or the like comprising pressure steam supply means, an insulated head having a closed bottom end, a top end and a partition member disposed therebetween and forming with said bottom end a steam storage operatively connected to said supply means for receiving steam therefrom at a predetermined pressure, hot plate means closing the top end of the head member to form above the partition member a dry steam chamber in heat exchanging relation to the steam storage for heating the chamber, steam outlet means having one end disposed above said bottom end of the storage, selectively operable means mounted below and operatively connected to said steam outlet means to draw steam therefrom, and dry steam delivery means operatively connected to said selectively operable means and extending upwardly therefrom through the storage and communicating with the chamber, the hot plate means having therein apertures in communication with the chamber for delivering steam from the storage to the chamber and thence to the exterior of the hot plate means under the control of said selectively operable means.

2. The combination of claim 1, having, in addition, baffle means mounted in the storage adjacent to said one end of the steam outlet means for deflecting condensation away therefrom.

3. The combination of claim 2 wherein said selectively operable means comprises solenoid operated valve means connected to said steam outlet means of the storage and to said dry steam delivery means and momentary switch means operatively connected to the solenoid operated valve means for momentarily actuating the valve means to admit therethrough a charge of dry steam.

4. The combination of claim 3 wherein said heating head member is adapted to be mounted below a table with the hot plate means exposed and received within an opening in said table.

5. The combination of claim 4 wherein said steam supply means comprises a boiler device mounted below and operatively connected to the storage.

6. The combination of claim 5 wherein said hot plate means apertures are geometrically arranged relative to a bun or the like adapted to be placed on the hot plate means to evenly distribute thereon the dry steam ejected through the apertures.

7. The combination of claim 1 wherein said heating head member is adapted to be mounted below a table with the hot plate means exposed and received within an opening in said table.

8. The combination of claim 1 wherein said steam supply means comprises a boiler device mounted below and operatively connected to the storage.

9. The combination of claim 1 wherein said hot plate means apertures are geometrically arranged relative to a bun or the like adapted to be placed on the hot plate means to evenly distribute thereon the dry steam ejected through the apertures.

10. A heating head assembly adapted to be mounted below a table for heating and warming buns or the like, comprising, a cylindrical member, a bottom plate welded to the member at a bottom end, an insulation sheath disposed about the member, clamp means for holding the sheath about the member and adapted to anchor the assembly below the table, a hot plate welded to the member at a top end adapted to be flush with the top of the table, said hot plate extending laterally beyond the member and above the table, a partition plate welded to the member intermediate the bottom and top ends thereof to define a stream pressure storage chamber therebelow and a dry steam chamber thereabove, a steam inlet conduit connected to the bottom plate, a steam outlet conduit connected to the bottom plate and projecting thereabove into the steam pressure storage chamber, a baffle plate disposed in protective relation to an upper end of the steam outlet conduit, a dry steam delivery conduit connected to the bottom and partition plates and extending through the steam pressure chamber with an upper end thereof in communication with the dry steam chamber, and solenoid operated valve mechanism mounted below the bottom plate and connected to the steam outlet and delivery conduits.

11. A steaming head assembly for warming food products comprising a vertically disposed tubular casing member having open upper and lower ends, an apertured plate member extending across said upper end of said casing member, a first plate member extending across said casing member spaced from said apertured plate member and defining a dry steam chamber therewith, another plate member extending across said casing member spaced from said first plate member and defining a steam storage chamber therewith, a raw steam inlet conduit extending through said other plate member for introducing steam to said storage chamber from a source of steam supply, a steam outlet conduit extending through and above said other plate member and spaced from said raw steam inlet passage, a dry steam inlet conduit extending through both of said plate members and spaced from said raw steam inlet conduit for introducing dry steam into said dry steam chamber, and a control valve disposed on the side of said other plate member remote from said steam storage chamber and connecting said steam outlet conduit to said dry steam inlet conduit for selectively admitting steam from said steam storage chamber to said dry steam chamber.

12. A steaming head assembly for warming food produces comprising a vertically disposed tubular casing member having open upper and lower ends, an apertured plate member extending across said upper end of said casing member, a first plate member extending across said casing member spaced from said apertured plate member and defining a dry steam chamber therewith, another plate member extending across said casing member spaced from said first plate member and defining a steam storage chamber therewith, a raw steam inlet conduit extending through said other plate member for introducing steam to said storage chamber from a source of steam supply, a steam outlet conduit extending through and above said other plate member and spaced from said raw steam inlet passage, a dry steam inlet conduit communicating with said dry steam chamber and extending therefrom to the side of said other plate member remote from said steam storage chamber and having at least a portion of the wall thereof in contact with the steam in said steam storage chamber and spaced from said raw steam inlet conduit for introducing dry steam into said dry steam chamber, and a control valve disposed on the side of said other plate member remote from said steam storage chamber and connecting said steam outlet conduit to said dry steam inlet conduit for selectively admitting steam from said steam storage chamber to said dry steam chamber.

References Cited by the Examiner

UNITED STATES PATENTS

| | | | |
|---|---|---|---|
| 1,963,822 | 6/1934 | Beede | 38—15 |
| 2,181,434 | 11/1939 | Lewis et al. | 126—369 X |
| 2,617,349 | 11/1952 | Tucker | 99—234 X |
| 2,620,789 | 12/1952 | Gregory | 99—234 X |
| 2,973,705 | 3/1961 | Klemm | 99—234 |

WALTER A. SCHEEL, *Primary Examiner.*

GEORGE NINAS, JR., E. HOROWITZ,
*Assistant Examiners.*